United States Patent [19]
Byrnes et al.

[11] Patent Number: 5,159,862
[45] Date of Patent: Nov. 3, 1992

[54] METHOD AND APPARATUS FOR MACHINING THE INSIDE SURFACE OF A CLOSED HOLLOW CASING

[75] Inventors: Stephen L. Byrnes, Allegany, N.Y.; Robert G. Cosper, Jr., Smethport, Pa.

[73] Assignee: Dresser-Rand Company, Corning, N.Y.

[21] Appl. No.: 643,571

[22] Filed: Jan. 18, 1991

[51] Int. Cl.[5] ............................................. B23B 41/00
[52] U.S. Cl. .................................... 82/1.11; 82/1.4; 82/1.5; 408/54; 408/181; 408/708; 409/199
[58] Field of Search ................. 82/1.11, 1.2, 1.4, 1.5, 82/128, 113; 408/54, 708, 147, 158, 159, 180, 181, 187; 409/199

[56] References Cited
U.S. PATENT DOCUMENTS

| | | | |
|---|---|---|---|
| 1,356,871 | 10/1920 | Martin | 408/181 X |
| 2,284,336 | 5/1942 | Morrison | 82/1.2 |
| 2,744,423 | 5/1956 | Edera et al. | 408/147 |
| 3,127,795 | 4/1964 | Quick et al. | 408/54 |
| 3,383,957 | 5/1968 | McCann | 82/1.4 |
| 3,604,309 | 9/1971 | Berthiez | 409/199 |
| 3,966,347 | 6/1976 | Watson | 408/147 |
| 4,509,236 | 4/1985 | Morita et al. | 82/1.5 |
| 4,758,121 | 7/1988 | Kwech | 82/1.2 |
| 4,842,452 | 6/1989 | Strait | 408/83.5 |
| 4,979,850 | 12/1990 | Dompé | 408/708 |
| 5,030,041 | 7/1991 | Marron | 408/181 X |

FOREIGN PATENT DOCUMENTS

| | | | |
|---|---|---|---|
| 2734126 | 2/1979 | Fed. Rep. of Germany | 82/1.2 |
| 8606669 | 11/1986 | PCT Int'l Appl. | 82/1.2 |
| 548382 | 4/1977 | U.S.S.R. | 82/1.2 |

Primary Examiner—Larry I. Schwartz
Assistant Examiner—Kevin J. Carroll
Attorney, Agent, or Firm—Richards, Medlock & Andrews

[57] ABSTRACT

A method and apparatus for machining the inside surface of the two halves of the hollow casing of a machine or the like with the two halves positioned and mated together to form the closed hollow casing thereby providing machined areas on the inside surface of the two halves which are symmetrical and in line. The apparatus comprises a support structure in the form of a boring bar extending through the closed housing. A pair of spaced bearings in the closed hollow casing rotatably support the boring bar. Positioning apparatus is operatively attached to the boring bar for rotating and axially positioning the boring bar within the closed hollow casing. Support assemblies are positioned within the closed hollow casing and are attached to the boring bar to move with the boring bar. Cutter devices are attached to the support assemblies and are movable in a radial direction with respect to the boring bar to machine the inside surface of the closed hollow casing. Control apparatus is provided for controlling the radial movement of the cutter devices while the boring bar and cutter devices are being rotated.

18 Claims, 3 Drawing Sheets

METHOD AND APPARATUS FOR MACHINING THE INSIDE SURFACE OF A CLOSED HOLLOW CASING

BACKGROUND OF THE INVENTION

Although this invention is applicable to the machining of the inside surface of various types of closed hollow casings or housings, it has been found particularly useful in the environment of the machining of the two halves of the hollow casing or housing of a turbomachine, e.g. a compressor, with the two halves positioned to form a closed hollow casing or housing. Therefore, without limiting the applicability of the invention to "the machining of the inside surface of the closed hollow casing for a compressor", the invention will be described in such environment.

In the production of the casing or housing for turbomachines, e.g. large compressors in the 3, 4 and 5M ranges, it is necessary to machine the inside diameters, contoured areas, shoulders, return bend areas, etc. In the past, the machining process has been a tedious and time consuming task for a number of reasons. In the prior method of machining, only one half of the casing was machined at a time and then the other half of the casing was machined. The problem that occurred because of this procedure was that when the two halves were combined to form the overall casing, the machined areas did not always align and mate between the two halves.

In the machining of one of the halves of the casing, a boring bar was rotatably supported in the half casing, a boring head was attached to the boring bar and a single cutting bit was bolted to the boring head. When a groove or a deeper cut was to be machined into the inside surface, the boring bar was rotated and the cutting bit cut a groove. The boring bar was then stopped, the screws holding the cutting bit were loosened, a dial indicator would be placed up against the cutting bit and boring head, the cutting bit would be extended radially an amount determined by the proper reading on the dial indicator, the screws holding the cutting bit were tightened and the boring bar would then be rotated and the process would be repeated until the proper depth of the groove was achieved. If the groove or channel to be machined was wider than the cutting bit, then the boring bar would be moved axially and the cutting process would be repeated. It will be greatly appreciated that the problem with this procedure is the great amount of time required to machine the inside surface of each half of the casing.

An even larger problem occurred when it was necessary to machine a return bend in the surface with a return bend being a groove in the shape of a half cylinder. Then it was not only necessary to extend the cutting bit radially after each cut but it was also necessary to axially move the boring bar after each cut in order to obtain the arc shape at the bottom of the groove. It was not possible to plunge-cut the return bend in the inside surface of the half casing.

The present invention overcomes these problems by providing apparatus which machines the two halves of the casing in one operation while the two halves are positioned and mated together to form the complete casing thereby providing machined areas in the inside surface of the two halves which machined areas are symmetrical and in line. The present invention also provides the capability of plunge-cut machining without stopping the machining process. The machining process can be started and run through completion without stopping to change the position of the cutter tool or insert since the position of the cutter tool or insert is moved to various predetermined positions while it is being rotated within the casing. The present invention allows the machining process to be completed in a much shorter time than with the prior art because the positioning of the cutter tool or insert is changed without stopping the process and because two cutter tools or inserts are provided rather than just one. The present invention machines return bends on the inside surface of the casing without stopping the machining process. The machining is much more precise and accurate.

SUMMARY OF THE INVENTION

This invention provides a method and apparatus for machining the inside surface of the two halves of the hollow casing of a machine or the like with the two halves positioned and mated together to form the closed hollow casing thereby providing machined areas on the inside surface of the two halves which are symmetrical and in line. The apparatus comprises support means in the form of a boring bar extending through the closed housing. A pair of spaced bearings in the closed hollow casing rotatably support the boring bar. Positioning means is operatively attached to the boring bar for rotating and axially positioning the boring bar within the closed hollow casing. A support assembly is positioned within the closed hollow casing and is attached to the boring bar to move with the boring bar. Cutter means is attached to the support assembly and is movable in a radial direction with respect to the boring bar to machine the inside surface of the closed hollow casing. Control means is provided for controlling the radial movement of the cutter means while the boring bar and cutter means are being rotated.

BRIEF DESCRIPTION OF THE DRAWINGS

Other advantages and features of the invention will become more apparent with reference to the following detailed description of a presently preferred embodiment thereof in connection with the accompanying drawings, wherein like reference numerals have been applied to like elements, in which.

DETAILED DESCRIPTION

Figure 1:
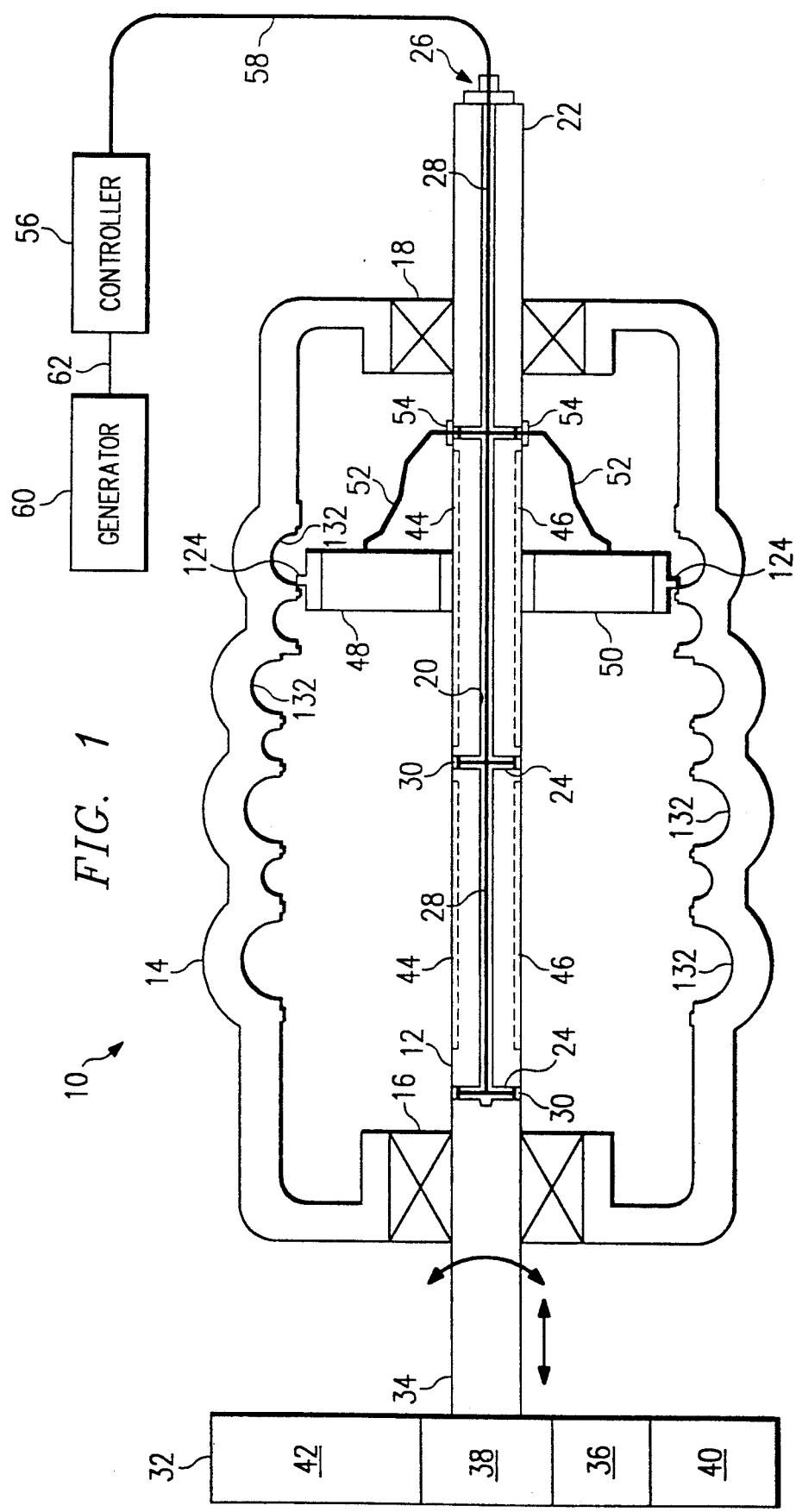
FIG. 1 is a simplified top plan view of machining apparatus constructed in accordance with the present invention and located in the casing of a machine with the top half of the casing removed.

Referring to the drawing and FIG. 1 in particular, shown therein and generally designated by the reference character 10 is the machining apparatus that is constructed in accordance with this invention and which is capable of machining the inside diameters, contoured areas, return bend areas, etc. of large welded and cast turbomachine casings in the 3, 4 and 5M ranges. As illustrated, the machining apparatus 10 comprises a support means or boring bar 12 extending through the closed hollow casing 14 of a turbomachine. The top half of the casing, which is essentially a mirror image of the bottom half, is removed in order to show the elements of the machining apparatus 10 which are operatively positioned within the closed hollow casing 14. Boring bar 12 is supported in casing 14 by spaced bearing inserts 16 and 18 positioned in opposite ends of casing 14. Bore 20 is gun-drilled down the center of boring bar 12 from a first end 22 thereof. Bores 24 are formed radially in boring bar 12 to connect with bore 20. Slip ring assembly 26 is mounted on first end 22 with wiring cables 28 connected between the slip ring assembly 26 and jacks 30 positioned in bores 24. In the preferred embodiment, slip ring assembly 26 is a mercury slip ring assembly to eliminate any noise or at least to minimize any noise introduced into the wiring cables 28.

Positioning means 32 is operatively attached to the second end 34 of boring bar 12 and comprises a drive motor 36 coupled to a feed-gear train 38 to move the boring bar 12 axially with respect to casing 14 and to rotate boring bar 12. Drive motor 36 is controlled by either manual control means 40 or programmable control means 42 to control the axial position and rotational speed of boring bar 12.

Keyways or channels 44 and 46 are cut into boring bar 12 at one hundred and eighty degrees from each other along a predetermined section of boring bar 12. Boring head assemblies 48 and 50 are operatively attached to boring bar 12 via keyways 44 and 46, respectively. Details of boring head assemblies 48 and 50 will be discussed below with reference to FIG. 2. Boring head assemblies 48 and 50 are connected to jacks 30 by cables 52 and plugs 54. Slip ring assembly 26 is connected to controller 56 by cable 58 while generator 60 is connected to controller 56 by cable 62. In the preferred embodiment, generator 60 comprises a pulse generator and controller 56 comprises a digital-readout servo controller including a programmable controller.

Figure 2:
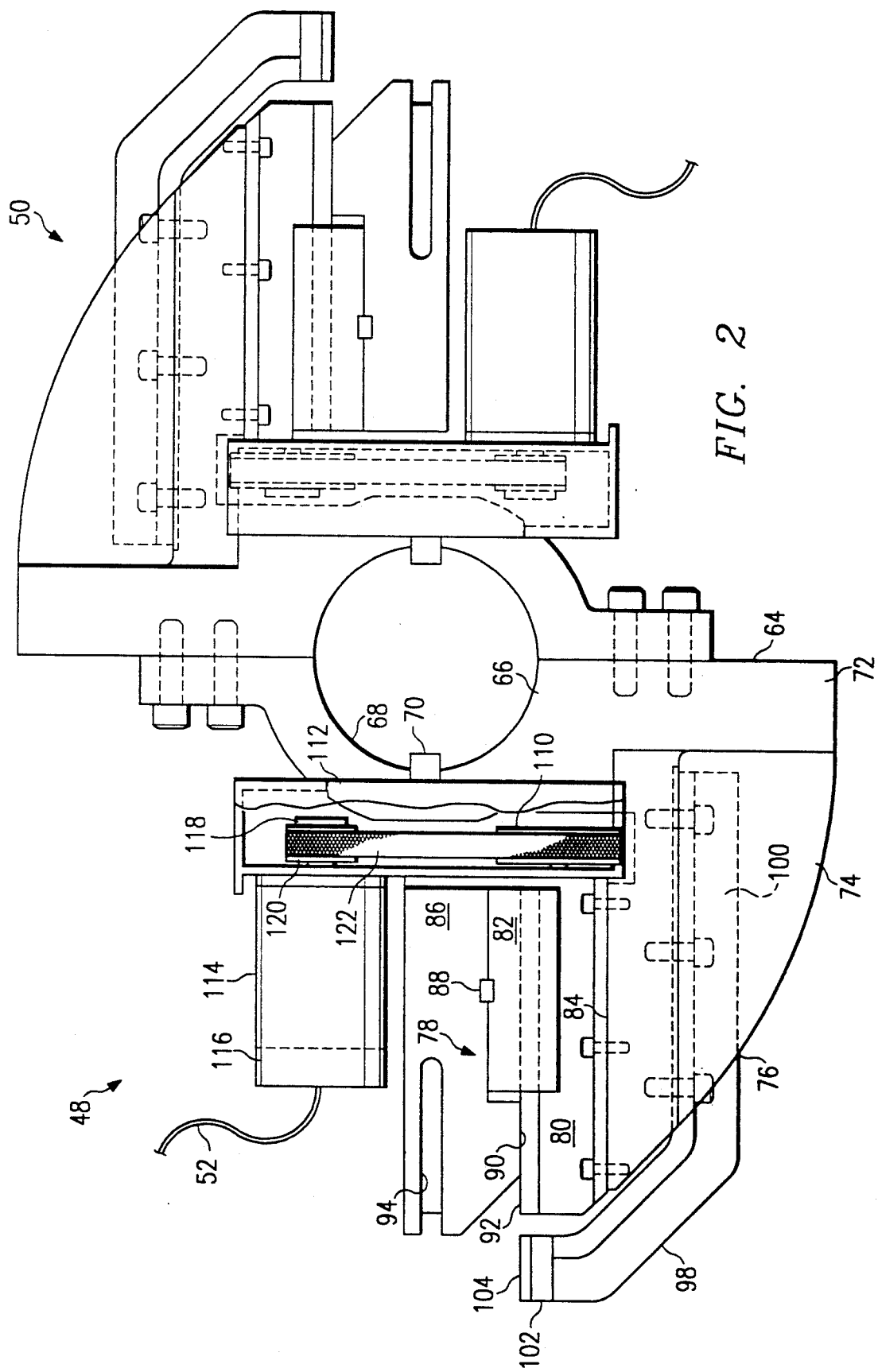
FIG. 2 is a simplified side elevational view of the support assembly of the present invention.

With reference to FIG. 2, two support assemblies or boring heads 64 are disclosed which are identical in structure. Only one of the boring heads 64 will be discussed in detail. Each boring head 64 comprises an elongated portion 66 having an arcuate portion 68 with a radius formed to fit boring bar 12. Fastening means 70 mates with keyway 44 in boring bar 12 to attach the boring head 64 to the boring bar 12. Extending from and attached to end 72 is a right angle extension 74 having an opening 76 formed therein in the form of a channel.

Slide assembly 78 comprises a lower stationary portion 80 and an upper slide portion 82. Lower stationary portion 80 is attached to surface 84 of right angle extension 74 while upper slide portion 82 moves with respect to the lower stationary portion 80 in a direction away from elongated portion 66 from it's position as shown in FIG. 2.

Tool block 86 is attached to upper slide portion 82 by fastening means 88 to move with upper slide portion 82. Lower surface 90 of tool block 86 is supported by and slides on upper surface 92 of lower stationary portion 80. Tool block 86 includes mounting means 94 in the form of a slot formed in the side thereof for mounting a tool bit 96 (see FIG. 4) therein.

Outboard support 98, which is generally L-shaped, has a first end 100 inserted into opening 76 and attached to right angle extension 74. Second end 102 extends to a position near lower stationary portion 80 such that surface 104 of second end 102 is in the same plane as upper surface 92 of lower stationary portion 80. Outboard support 98 is attached and used only when the diameter of the casing 14 is such that tool block 86 is extended outwardly from boring bar 12 such that lower surface 90 is no longer supported by upper surface 92 and must then be supported by surface 104 during the machining operation or process.

Figure 3:
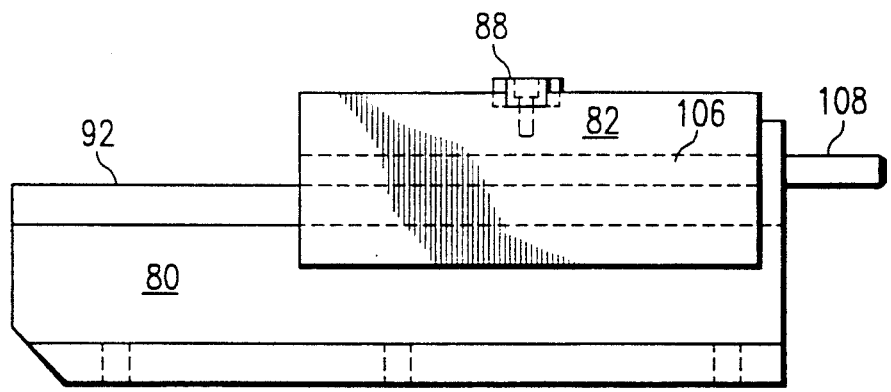
FIG. 3 is a simplified side elevational view of the slide assembly of the present invention.

With reference to FIGS. 2 and 3, slide assembly 78 includes a feed gear 106 to move upper slide portion 82 away from and/or toward boring bar 12 and drive shaft 108 with attached sprocket 110 to drive feed gear 106. Lower stationary portion 80 is attached to mounting means 112. Servo motor 114 is also attached to mounting means 112 and includes encoder means 116, shaft 118 and sprocket 120 attached to shaft 118. Sprocket 120 is attached to and drives sprocket 110 of slide assembly 78 via belt 122. Cable 52 includes the wiring to carry the power to servo motor 114 and the feedback signals from the encoder means 116 to inform controller 56 of the position of the servo motor 114. In the preferred embodiment, mounting means 112 is structured in the form of a rectangular box which encloses drive shafts 108, 118, sprockets 110, 120 and belt 122 to prevent any filings, chips, etc. from the machining operation from contacting those elements. Servo motor 114 and slide assembly 78 are attached to one side panel of mounting means 112 while the opposite side panel is attached to elongated portion 66.

Figure 4:
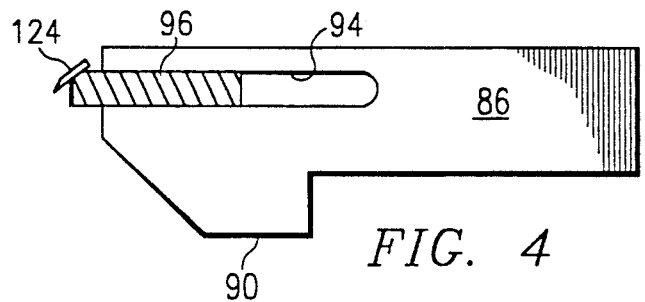
FIG. 4 is a simplified side elevational view of the tool block, tool bit and cutter insert of the present invention.

With reference to FIG. 4, tool block 86 is generally rectangular in shape with a lower surface 90. Tool bit 96 is mounted in mounting means or slot 94. At the outer extremity of tool bit 96 is the cutter insert 124 which in the preferred embodiment is a carbide insert and which performs the actual cutting or machining.

Figure 5:
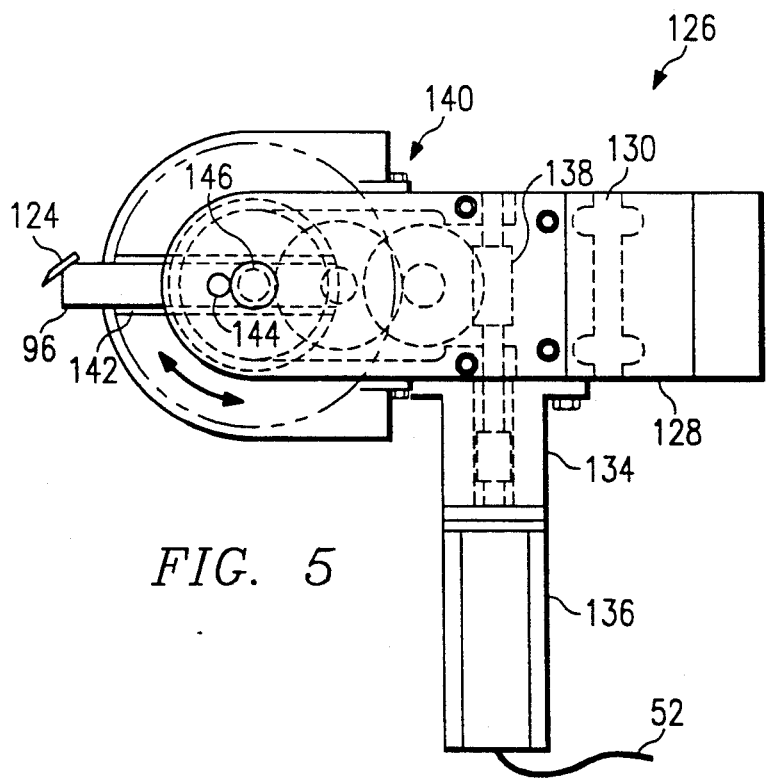
FIG. 5 is a simplified top plan view of the return bend head assembly of the present invention.

With reference to FIG. 5, return bend head assembly 126 comprises support body 128 which includes slot 130 formed therein. When the return bend head assembly 126 is to be used to machine return bends 132 (see FIG. 1) in casing 14, tool block 86 is removed from upper slide portion 82 and return bend head assembly 126 mounts to upper slide portion 82 using fastening means 88 in slot 130. Motor mount 134 attaches servo motor 136 to support body 128. Screw shaft 138 connects servo motor 136 to gear assembly 140 which rotates tool holder 142 in the plane of the drawing. An exemplary gear assembly is shown having three gears but it will be appreciated that the number of gears may change depending upon the required torque. Tool bit 96 is held in the tool holder by mounting means 144. The radius of the return bend 132 (see FIG. 1) is determined by the distance the cutter insert 124 is from shaft 146 and this distance can be changed by moving the tool bit 96 in or out with respect to shaft 146. The depth of the return bend 132 into the casing 14 is determined by the amount upper slide portion 82 in moved away from boring bar 12 and thereby moving the cutter insert 124 with respect to casing 14.

In operation, the boring bar 12 is placed in bearing inserts 16 and 18 in casing 14 and connected to positioning means 32. Boring head assemblies 48 and 50, with either tool blocks 86 or return bend head assemblies 126 installed on slide assembly 78, are mounted in keyways 44 and 46 of boring bar 12 and plugs 54 are inserted into jacks 30. Cable 58 is connected between slip ring assembly 26 and controller 56. Boring bar 12 is positioned axially such that boring head assemblies 48 and 50 are positioned at the correct location to start the machining process. The rotation of boring bar 12 is started. If the manual mode is to be used for the axial positioning of the boring bar 12, then the manual control means 40 is manned by an operator to assure insertion of the proper signals at the correct time to control the axial and rotational movement of boring bar 12 as the operator manning the generator 60 assures insertion of the proper signals at the correct time to be sent to controller 56. The correct signals are then sent from controller 56 to servo motors 114 to cause the correct movement of upper slide portions 82 so that cutter inserts 124 are correctly positioned to provide the correct machining of the inside surface of casing 14. If the return bend head assemblies 126 are being used in place of tool blocks 86, then signals are also sent from controller 56 to servo motors 136 to cause rotation of cutter inserts 124 to machine the return bends into the inside surface of casing 14.

If the programmable control means 42 and the programmable controller in controller 56 are to be used, then the proper programs will be loaded into the control means 42 and the controller for the particular machining to be performed and the execution of the programs will be coordinated to perform the machining operation.

In either the manual mode or the programmed mode, the boring bar 12 is moved axially in coordination with the movement of the upper slide portion 82, which moves the cutter insert 124, as the boring bar is rotated to result in the machining of the inside surface of both halves of the casing 14 in one continuous operation.

A typical machining operation might be performed on a casing which is five to six feet in diameter with the boring bar being fifteen to twenty feet in length and ten inches in diameter and rotating at fifteen to twenty rpm.

From the foregoing detailed description, it can be appreciated that machining apparatus constructed and operated in accordance with this invention provides an improved apparatus and method of machining the inside surface of a closed hollow casing which is faster and more accurate resulting in a less costly operation.

Although the present invention has been described with reference to a presently preferred embodiment, it will be appreciated by those skilled in the art that various modifications, alternatives, variations, etc., may be made without departing from the spirit and scope of the invention as defined in the appended claims.

We claim:

1. Apparatus for machining the inside surface of two halves of a hollow casing of a machine with the two halves positioned to form a closed hollow casing, said apparatus comprising:
   support means extending through the closed hollow casing;
   a pair of spaced bearings positioned in opposite ends of the closed hollow casing rotatably supporting said support means;
   positioning means operatively attached to said support means for rotating and axially positioning said support means within said closed hollow casing;
   a support assembly positioned within the closed hollow casing and operatively attached to said support means to move therewith;
   a stationary portion attached to said support assembly and having a support surface formed thereon;
   a slide portion operatively connected to a motor assembly and encoder and mounted to said stationary portion for radial movement thereon with respect to said support means;
   a tool block mounted to said slide portion and having a lower surface supported by said support surface of said stationary portion during a predetermined portion of the radial movement of said slide portion;
   a tool bit mounted to said tool block;
   a cutter insert mounted to said tool bit to machine the inside surface of said closed hollow casing;
   means for controlling the radial movement of said slide portion while said support means is being rotated; and
   an outboard support member mounted into said support assembly and extending radially outwardly from said support assembly and having a support surface positioned to support said lower surface of said tool block as said lower surface of said tool block moves radially outwardly beyond the support surface of said stationary portion.

2. The apparatus of claim 1 wherein said tool bit is removably mounted to said tool block.

3. The apparatus of claim 1 wherein said support means comprises a cylindrical shaft.

4. The apparatus of claim 1 wherein said positioning means comprises a power source and gear train operatively coupled to said support means.

5. The apparatus of claim 4, wherein said positioning means further includes means for controlling said power source.

6. The apparatus of claim 4, wherein said positioning means further comprises programmable control means operatively connected to and structured to control the rotation of and the axial position of said support means.

7. Apparatus for machining the inside surface of two halves of a hollow casing of a machine with the two halves positioned to form a closed hollow casing, said apparatus comprising:
   support means extending through the closed hollow casing;
   a pair of spaced bearings in the closed hollow casing rotatably supporting said support means;
   positioning means operatively attached to said support means for rotatably and axially positioning said support means within said closed hollow casing;
   a support assembly positioned within the closed hollow casing and operatively attached to said support means to move therewith;
   a stationary portion attached to said support assembly and having a support surface formed thereon;
   a slide portion operatively connected to a motor assembly and encoder and mounted to said stationary portion for radial movement thereon with respect to said support means;
   a return bend head assembly mounted to said slide portion, said return bend head assembly including a tool holder mounted for rotational movement in a generally axial plane with respect to said support means, means for rotating said tool holder, means for mounting a tool bit in said tool holder and a cutter insert mounted on said tool bit to rotate and machine return bends in the inside surface of the closed hollow casing as said support means is rotated within the closed hollow casing; and
   means for controlling the radial movement of said slide portion while said support means is being rotated.

8. The apparatus of claim 7 wherein said tool bit is removably mounted to said tool holder.

9. The apparatus of claim 7 wherein said support means comprises a cylindrical shaft.

10. The apparatus of claim 7 wherein said positioning means comprises a power source and gear train operatively coupled to said support means.

11. The apparatus of claim 10 wherein said positioning means further includes means for controlling said power source.

12. The apparatus of claim 10 wherein said positioning means further comprises programmable control means operatively connected to and structured to control the rotation of an the axial position of said support means.

13. The apparatus of claim 7 wherein said tool bit is movable in the racial direction.

14. The apparatus of claim 7 wherein said means for rotating said tool holder includes a servo motor operatively connected to a gear assembly.

15. A method of machining the inside surface of two halves of a hollow casing of a machine with the two halves positioned to form a closed hollow casing, said method comprising the steps of:

rotatably supporting a boring bar in the closed hollow casing along the central axis thereof, said boring bar including an attached support assembly comprising a stationary portion having a support surface formed thereon, a slide portion mounted to said stationary portion for radial movement thereon, a tool block mounted to said slide portion and having a lower surface supported by said support surface during a predetermined portion of the radial movement of said slide portion, a tool bit mounted to said tool block, a cutter insert mounted to said tool bit, and a motor assembly and encoder for controlling the radial movement of said slide portion;

attaching said boring bar to positioning means to provide rotational and axial movement and control of said movement of said boring bar;

rotating said boring bar at a predetermined speed;

moving said boring bar axially to a predetermined location;

moving said slide portion in a radial direction to cause said cutter insert to contact and machine the inside surface of said closed hollow casing; and attaching an outboard support member to said support assembly, said outboard support member extending radially outwardly from said support assembly and having a support surface positioned to support said lower surface of said tool block as said lower surface of said tool block moves radially outward beyond the support surface of said stationary portion.

16. The method of claim 15 further comprising the steps of moving said boring bar axially to a succession of predetermined locations in accordance with a predetermined pattern while moving said slide portion in a radial direction to cause said cutter insert to contact and machine the inside surface of said closed hollow casing at each of said succession of predetermined locations in accordance with a predetermined pattern.

17. A method of machining the inside surface of two halves of a hollow casing of a machine with the two halves positioned to form a closed hollow casing, said method comprising the steps of:

rotatably supporting a boring bar in the closed hollow casing along the central axis of said closed hollow casing, said boring bar including an attached support assembly comprising a stationary portion having a support surface formed thereon, a slide portion mounted to said stationary portion for general radial movement thereon with respect to said central axis, a return bend head assembly mounted to said slide portion and including a tool holder mounted for rotational movement in generally axial planes with respect to said central axis, means for rotating said tool holder in said generally axial planes, means for mounting a tool bit in said tool holder with a cutter insert mounted on said tool bit, and means for controlling the radial movement of said slide portion;

attaching said boring bar to positioning means to provide rotational and axial movement of said boring bar with respect to said central axis and to provide control of said movement of said boring bar;

utilizing said positioning means to rotate said boring bar about said central axis at a predetermined speed;

utilizing said positioning means to move said boring bar axially along said central axis to a predetermined location;

utilizing said means for rotating said tool holder to rotate said tool holder, tool bit and cutter insert in said generally axial planes; and utilizing said means for controlling the radial movement of said slide portion to move said slide portion in a generally radial direction with respect to said central axis to cause said cutter insert to contact and machine a return bend in the inside surface of said closed hollow casing.

18. The method of claim 17 further comprising the steps of utilizing said positioning means to move said boring bar axially with respect to said central axis to a succession of predetermined locations spaced apart along said central axis in accordance with a predetermined pattern while utilizing said means for controlling the radial movement of said slide portion to move said slide portion generally radially with respect to said central axis to cause said cutter insert to contact and machine a return bend in the inside surface of said closed hollow casing at each of said succession of predetermined locations in accordance with a predetermined pattern.

* * * * *

UNITED STATES PATENT AND TRADEMARK OFFICE
CERTIFICATE OF CORRECTION

PATENT NO. : 5,159,862

DATED : November 3, 1992

INVENTOR(S) : Stephen L. Byrnes, ET AL

It is certified that error appears in the above-identified patent and that said Letters Patent is hereby corrected as shown below:

Column 1, between title and first line of text, please insert:

--FIELD OF THE INVENTION

This invention relates generally to closed hollow casings or housings. More particularly, but not by way of limitation, this invention relates to the method and apparatus for machining the inside surface of two halves of the hollow casing or housing of a machine or the like with the two halves positioned to form a closed hollow casing or housing.--.

UNITED STATES PATENT AND TRADEMARK OFFICE
CERTIFICATE OF CORRECTION

PATENT NO. : 5,159,862
DATED : November 3, 1992
INVENTOR(S) : Stephen L. Byrnes, ET AL It is certified that error appears in the above-identified patent and that said Letters Patent is hereby corrected as shown below:

```
Column 6, line 14, change "into" to --to--;
          line 44, change "rotatably" to --rotating--.
Column 7, line 14, change "an" to --and--;
          line 17, change "racial" to --radial--.
Column 8, line 15, change "general" to --generally--.
```

Signed and Sealed this

Fifteenth Day of February, 1994

Attest:

BRUCE LEHMAN

Attesting Officer     Commissioner of Patents and Trademarks